(No Model.) 2 Sheets—Sheet 1.

J. SMITH & T. F. HOREN.
BUOYANT SCREW PROPELLER.

No. 432,335. Patented July 15, 1890.

Witnesses
Wayne Reid
F. H. Moore

Inventor
James Smith
Thomas F. Horen
by Wm. M. Monroe
Attorney.

THE NORRIS PETERS CO., PHOTO-LITHO., WASHINGTON, D. C.

(No Model.) 2 Sheets—Sheet 2.

J. SMITH & T. F. HOREN.
BUOYANT SCREW PROPELLER.

No. 432,335. Patented July 15, 1890.

Witnesses

Inventor.
James Smith
Thomas F. Horen
by Wm. M. Monroe
Attorney.

UNITED STATES PATENT OFFICE.

JAMES SMITH AND THOMAS F. HOREN, OF CLEVELAND, OHIO.

BUOYANT SCREW-PROPELLER.

SPECIFICATION forming part of Letters Patent No. 432,335, dated July 15, 1890.

Application filed April 18, 1890. Serial No. 348,457. (No model.)

*To all whom it may concern:*

Be it known that we, JAMES SMITH and THOMAS F. HOREN, citizens of the United States, and residents of Cleveland, county of Cuyahoga, State of Ohio, have invented certain new and useful Improvements in Screw-Propellers, of which we hereby declare the following to be a full, clear, and exact description, such as will enable others skilled in the art to which it appertains to make and use the same.

Our invention relates to improvements in screw-propellers for vessels; and its objects are to increase the surface of the screw acting upon the water, and also to increase the speed and buoyancy of the vessel.

Our invention consists in the employment of cylindrical hollow drums with exterior screw-blades and stationary pointed extremities, in means for revolving the drums and supporting the hull of a vessel thereon, and in the details of construction and arrangement of the various parts, as shown in the accompanying drawings, described in the specification, and more particularly pointed out in the claim.

Figure 1:
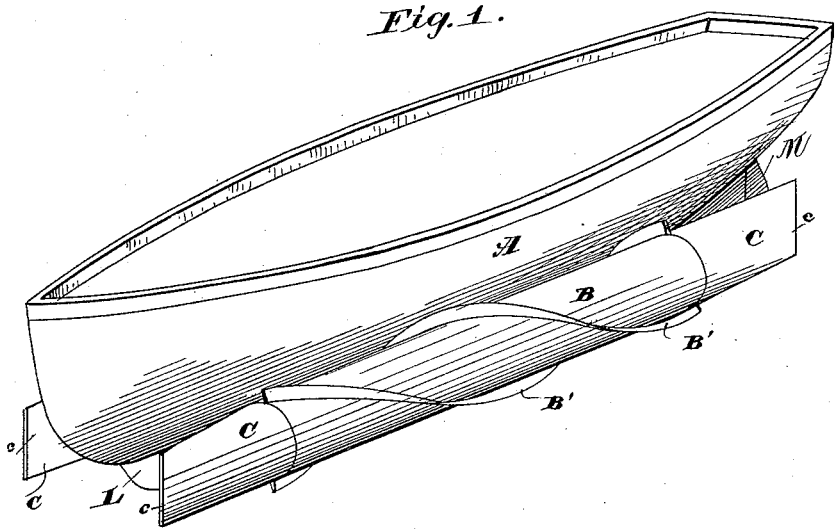
Figure 2:
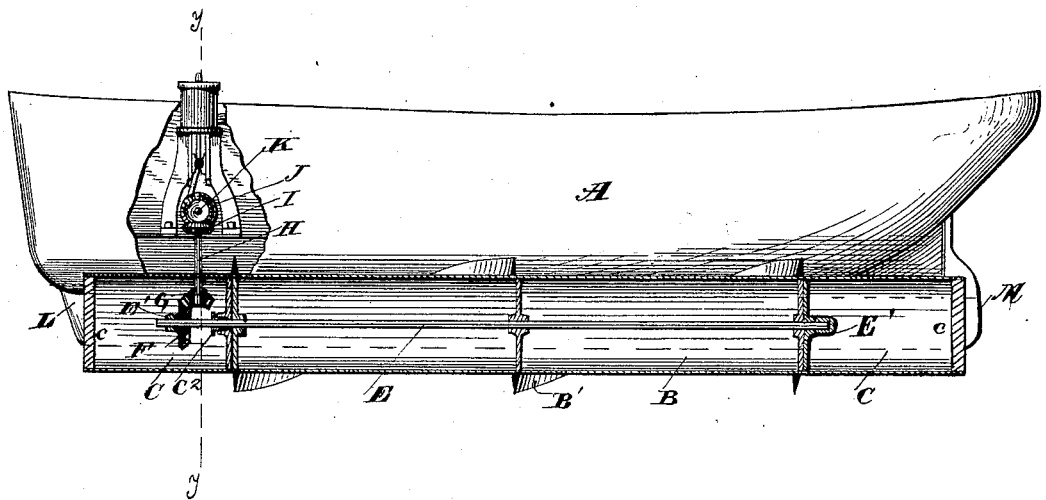
Figure 3:
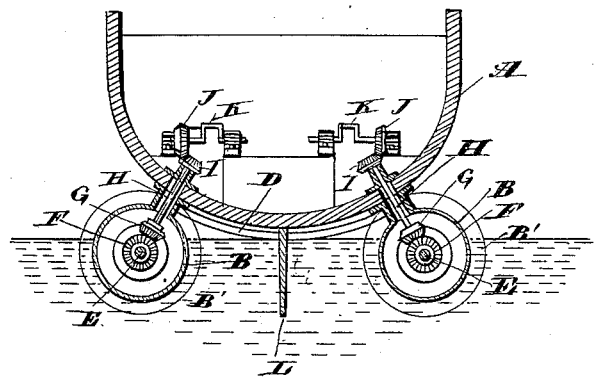
Figure 4:
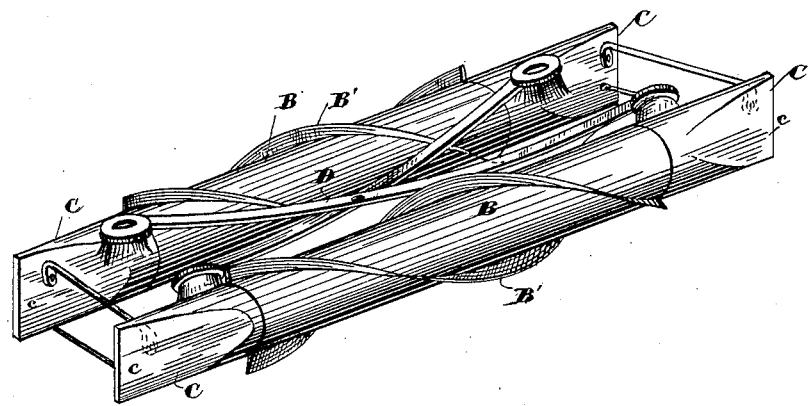

In the accompanying drawings, Figure 1 is a perspective view of our device. Fig. 2 is a longitudinal vertical section through one of the propeller-drums. Fig. 3 is a transverse section through line $y\ y$, Fig. 2. Fig. 4 is a perspective view of the duplicate drums with their connecting frame or platform.

In the drawings, A represents the hull of a vessel, supported upon two drums, as B, on either side in such a manner that the drums will not be entirely immersed in the water. The drums B are hollow and air-tight, and serve as lighters to support the vessel above the water-line. Spiral blades, as B', surround these drums from end to end, and by the revolution of the drums serve as the motive power to drive the vessel and drums through the water.

In order that the drums may revolve easily and independently, stationary fixed heads, as C, are placed in close juxtaposition to the drums at either end, and are rigidly connected with a frame of I-beams or other suitable platform D, which upholds the vessel and the driving mechanism.

Shafts, as E, rigidly secured to the drums B, are supported in bearings, as E', on the heads C, and water-tight glands and stuffing-boxes, as $C^2$, exclude the water. These heads C are conical or wedge-shaped, as shown in Fig. 1 at $c$, to admit of free movement through the water, the whole appearance of one of the drums and attached heads being that of a cigar pointed at both ends, so as to give the least resistance possible.

Any desired power may be applied to the vessel in common use, as steam, storage-batteries, or hand-power, the arrangement given being steam, and the shafts E being connected by gearing at F G with inclined shaft H, and gears I and J with the engine-shaft K. If desired, chain gearing and sprocket-wheels, as in other traction devices, may be substituted for bevel gearing, the exact manner of transmission of power not being of the nature of our invention.

A keel, as L, or center-board can easily be attached to the center of the vessel for steering, and the rudder, as M, attached, as usual, to the stern; or two rudders may be attached each to one of the heads C, respectively, in the manner of a catamaran.

The frame of the platform is shown as braced to prevent any derangement of line in the drums from interfering with its steering capacity or the action of its machinery, and it should be made as rigid and light as the weight of the engine and cargo will permit, attention also being paid to the warping action of the heavy seas.

By employing two engines, as shown in Fig. 3, the drums may be revolved at different rates of speed, or in opposite directions, thus permitting the rudder to be dispensed with if an accident should occur to it.

It will readily be observed that from the size and shape of the propeller and from its great buoyancy and slight displacement it is capable of great speed, while the power required to run it will be proportionately small.

It is not essential that the drums should be continuous, since a number of drums on a single shaft may be made to answer the purpose on a large vessel, and a number of short spiral flanges may take the place of the blades from end to end of the drum.

Having thus described our invention, what we claim as new, and desire to secure by Letters Patent, is—

In a vessel actuated by buoyant supporting-drums B, a rigid frame so braced as to resist lateral shocks or strains, conical or wedge-shaped heads rigidly attached to cylindrical hollow and air-tight drums which are pivotally suspended between the corresponding pairs of heads, and exterior longitudinal spiral flanges on the peripheries of the drums, substantially as described.

JAMES SMITH,
THOS. F. HOREN.

In presence of—
  WM. M. MONROE,
  F. H. MOORE.